(12) United States Patent
Park et al.

(10) Patent No.: US 9,366,805 B2
(45) Date of Patent: Jun. 14, 2016

(54) LIQUID CRYSTAL DISPLAY

(71) Applicant: SAMSUNG ELECTRONICS CO., LTD., Suwon-si, Gyeonggi-do (KR)

(72) Inventors: Jae Hyun Park, Seoul (KR); Jun Seok An, Suwon-si (KR); Yong Hun Kwon, Anyang-si (KR); Nae Won Jang, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 209 days.

(21) Appl. No.: 14/056,427

(22) Filed: Oct. 17, 2013

(65) Prior Publication Data

US 2014/0104538 A1  Apr. 17, 2014

(30) Foreign Application Priority Data

Oct. 17, 2012  (KR) .......................... 10-2012-0115265

(51) Int. Cl.
*G02F 1/1335* (2006.01)
*F21V 8/00* (2006.01)

(52) U.S. Cl.
CPC .............. *G02B 6/0091* (2013.01); *G02B 6/009* (2013.01); *G02B 6/0088* (2013.01); *G02B 6/0093* (2013.01); *G02F 1/133608* (2013.01); *G02B 6/0068* (2013.01); *G02B 6/0073* (2013.01); *G02B 6/0083* (2013.01)

(58) Field of Classification Search
CPC ................ G02B 6/0088; G02B 6/0091; G02F 1/133608
See application file for complete search history.

(56) References Cited

U.S. PATENT DOCUMENTS

| | | | |
|---|---|---|---|
| 2005/0253980 A1* | 11/2005 | Saito .................... | G02B 6/0038 349/64 |
| 2008/0239754 A1* | 10/2008 | Kang ................... | G02B 6/0091 362/617 |
| 2008/0304259 A1* | 12/2008 | Teng ............................. | 362/225 |
| 2010/0079697 A1* | 4/2010 | Park ..................... | G02B 6/0068 349/58 |
| 2010/0277664 A1* | 11/2010 | Kim ....................... | G02B 6/009 349/58 |
| 2011/0128756 A1* | 6/2011 | Cho et al. ....................... | 362/606 |
| 2011/0181809 A1* | 7/2011 | Sekiguchi et al. .............. | 349/62 |
| 2012/0087110 A1* | 4/2012 | Lee ........................ | G02B 6/009 362/97.3 |
| 2012/0281148 A1* | 11/2012 | Yoshikawa .................... | 348/725 |

(Continued)

FOREIGN PATENT DOCUMENTS

| | | | |
|---|---|---|---|
| JP | 2009-32664 | | 2/2009 |
| JP | WO 2011/089805 | * | 7/2011 |

(Continued)

OTHER PUBLICATIONS

Extended European Search Report dated Apr. 8, 2014 from European Patent Application 13188897.6, 6 pages.

*Primary Examiner* — Ryan Crockett
(74) *Attorney, Agent, or Firm* — Staas & Halsey LLP

(57) ABSTRACT

A LED module includes a printed circuit board, LEDs which are vertically mounted on the printed circuit board and which emit light onto a side surface, and a contact member which is provided to come into contact with a light guide plate. The printed circuit board may be movably coupled to a bottom chassis. When the light guide plate undergoes thermal expansion, the LED module may move by pressing of the light guide plate acting on the contact member. Accordingly, a gap between the light guide plate and the LEDs may be uniformly maintained even when the light guide plate undergoes thermal expansion or is returned to an original state.

24 Claims, 10 Drawing Sheets

(56) References Cited

U.S. PATENT DOCUMENTS

| | | | |
|---|---|---|---|
| 2012/0293727 A1* | 11/2012 | Yoshikawa | G02F 1/133608 348/739 |
| 2012/0320630 A1* | 12/2012 | Shimizu | G02B 6/0091 362/611 |
| 2013/0242600 A1* | 9/2013 | Franklin | G02B 6/0073 362/602 |
| 2013/0301295 A1* | 11/2013 | Iwasaki | F21V 7/00 362/609 |

FOREIGN PATENT DOCUMENTS

| | | |
|---|---|---|
| KR | 10-2010-0029394 | 3/2010 |
| WO | WO 2011/086814 | 7/2011 |

\* cited by examiner

LIQUID CRYSTAL DISPLAY

CROSS-REFERENCE TO RELATED APPLICATIONS

This application claims the priority benefit of Korean Patent Application No. 10-2012-0115265, filed on Oct. 17, 2012 in the Korean Intellectual Property Office, the disclosure of which is incorporated herein by reference for all purposes.

BACKGROUND

1. Field

Embodiments disclosed herein relate to a liquid crystal display in which a light emitting diode as a light source is provided at an edge portion and light is guided through a light guide plate to a liquid crystal panel. The liquid crystal display may be applied to a variety of electronic devices.

2. Description of the Related Art

In general, a LCD (Liquid Crystal Display) is a display device which includes a liquid crystal panel to display an image and a backlight unit to project light onto the liquid crystal panel and to convert an electric signal into visual information.

The backlight unit may include a light source and a variety of optical subsidiary members. For example, a CCFL (Cold Cathode Fluorescent Lamp), an EEFL (External Electrode Fluorescent Lamp), a LED (Light Emitting Diode), or the like may be used as the light source.

The backlight unit may be classified into a direct type backlight unit and an edge type backlight unit depending on a position of the light source. The edge type backlight unit generally includes a LGP (Light Guide Plate) to guide light emitted from the light source to the liquid crystal panel.

A light guide plate may generally be made of a plastic material such as PMMA (poly (methyl methacrylate)) due to the superior light transmittance of PMMA. However, since PMMA is sensitive to heat, the light guide plate may readily undergo thermal expansion when the LCD increases in temperature.

If the light guide plate undergoes thermal expansion, a gap between the light guide plate and the LED is narrowed and further the light guide plate may collide with the LED. Accordingly, in most LCDs of the related art, the light guide plate and the LED are arranged to be spaced apart from each other by a predetermined safety gap in order to prevent collision therebetween due to thermal expansion of the light guide plate.

SUMMARY

Therefore, it is an aspect of the present invention to provide a liquid crystal display in which a gap between a light guide plate and a light emitting diode is uniformly maintained even though the light guide plate undergoes thermal expansion.

Additional aspects of the invention will be set forth in part in the description which follows and, in part, will be apparent from the description, or may be learned by practice of the invention.

In accordance with an aspect of the present invention, a liquid crystal display includes a chassis assembly, a liquid crystal panel to display an image, a light guide plate to guide light to the liquid crystal panel, an LED module which is movable relative to the chassis assembly, the LED module including a printed circuit board which is disposed below the light guide plate, a plurality of LEDs which is vertically mounted on the printed circuit board and emit light onto a side surface of the light guide plate, and a contact member which is provided in the printed circuit board so as to come into contact with the side surface of the light guide plate, and an elastic member to elastically support the LED module.

When the light guide plate undergoes thermal expansion, the LED module may move in one direction by pressing of the light guide plate acting on the contact member, and when the light guide plate is returned to an original state, the LED module may move in an opposite direction by an elastic force of the elastic member. That is, the LED module may be configured to, adapted to, capable of, suitable for, etc., moving in a first direction by pressing of the light guide plate against the contact member, when the light guide plate undergoes thermal expansion, and the LED module may be configured to, adapted to, capable of, suitable for, etc., moving in an opposite direction of the first direction, by an elastic force of the elastic member, when the light guide plate is returned to an original state.

A gap between the light guide plate and the plural LEDs may be uniformly maintained in spite of or due to thermal expansion of the light guide plate.

The contact member may be provided separately from and coupled to the printed circuit board.

The printed circuit board may be formed with a fixing groove, and the contact member may be fitted into the fixing groove.

The contact member may include a contact portion which comes into contact with the light guide plate, an insertion portion which is inserted into the fixing groove, and a support portion which is supported by a back surface of the printed circuit board.

The contact member and the printed circuit board may be integrally formed.

The chassis assembly may include a top chassis having an opening to expose the liquid crystal panel, a middle mold to support the liquid crystal panel, and a bottom chassis to support the printed circuit board, and the printed circuit board may be movably coupled to the bottom chassis.

The liquid crystal display may further include a coupling member to couple the printed circuit board to the bottom chassis, and the printed circuit board may be formed with a coupling hole which is lengthily provided in a moving direction of the printed circuit board so that the coupling member is fastened into the coupling hole.

The bottom chassis may include a bottom portion and a side wall portion, and the elastic member may be coupled to the side wall portion.

The elastic member may include a fixing portion having a coupling groove into which the side wall portion is fitted, and a variable portion which extends obliquely from the fixing portion so as to come into contact with the LED module, and the elastic member may be elastically deformed so that an angle between the fixing portion and the variable portion is varied.

The side wall portion may include a locking hole, and the elastic member may include a locking protrusion which extends obliquely from the fixing portion and is inserted into the locking hole so as to prevent the elastic member from being separated from the side wall portion.

In accordance with another aspect of the present invention, a liquid crystal display includes a bottom chassis, a printed circuit board which is movably coupled to an edge portion of the bottom chassis, a plurality of LEDs which is mounted on the printed circuit board in a longitudinal direction thereof, a pair of contact members which are provided at opposite ends of the printed circuit board in the longitudinal direction thereof, a light guide plate which is disposed over the printed circuit board so as to come into contact with the pair of the contact members, and in which light emitted from the plural LEDs is incident upon a side surface of the light guide plate, and an elastic member which is coupled to the bottom chassis so as to elastically support the printed circuit board.

When the light guide plate undergoes thermal expansion, the printed circuit board and the plural LEDs mounted on the printed circuit board may move in one direction by pressing of the light guide plate acting on the contact members, and when the light guide plate is returned to an original state, the printed circuit board and the plural LEDs mounted on the printed circuit board may move in opposite directions by an elastic force of the elastic member.

Each of the contact members may include a contact portion which comes into contact with the light guide plate, an insertion portion which is inserted into a fixing groove, and a support portion which is supported by a back surface of the printed circuit board, and the bottom chassis may include a receiving groove to receive the support portion.

The bottom chassis may include a bottom portion and a side wall portion, and the elastic member may include a fixing portion having a coupling groove into which the side wall portion is fitted, and a variable portion which extends obliquely from the fixing portion so as to come into contact with the printed circuit board.

The liquid crystal display may further include a top chassis having an opening to expose a liquid crystal panel, and a middle mold to support the liquid crystal panel.

In accordance with a further aspect of the present invention, a display device includes a liquid crystal panel to display an image, a light guide plate to guide light to the liquid crystal panel, a bottom chassis, an LED module including a printed circuit board which is disposed below the light guide plate and is movably coupled to the bottom chassis, a plurality of LEDs which is vertically mounted on the printed circuit board and emits light onto a side surface of the light guide plate, and a contact member which is provided in the printed circuit board so as to come into contact with the side surface of the light guide plate, a coupling member to couple the printed circuit board to the bottom chassis, and an elastic member to elastically support the LED module.

The coupling member may include a screw.

In accordance with a further aspect of the present invention, a liquid crystal display includes a liquid crystal panel to display an image, a light guide plate to guide light to the liquid crystal panel, a bottom chassis, a light source module comprising a printed circuit board disposed below the light guide plate and movably coupled to the bottom chassis, a plurality of light sources mounted on the printed circuit board a predetermined distance from the light guide plate, and a contact member disposed on the printed circuit board adjacent to the light guide plate, and a coupling member to couple the printed circuit board to the bottom chassis.

The printed circuit board may be may be configured to, adapted to, capable of, suitable for, etc., moving proportion to an expansion of the light guide plate while maintaining the predetermined distance between the light sources and light guide plate.

The liquid crystal display may further include an elastic member to elastically support the light source module. The elastic member may include a plate spring. The elastic member may contact the printed circuit board and the contact member, and be deformable according to an expansion of the light guide plate. A distance between the light source module and a side wall of the bottom chassis may decrease or increase according to the expansion of the light guide plate and the deformation of the elastic member.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
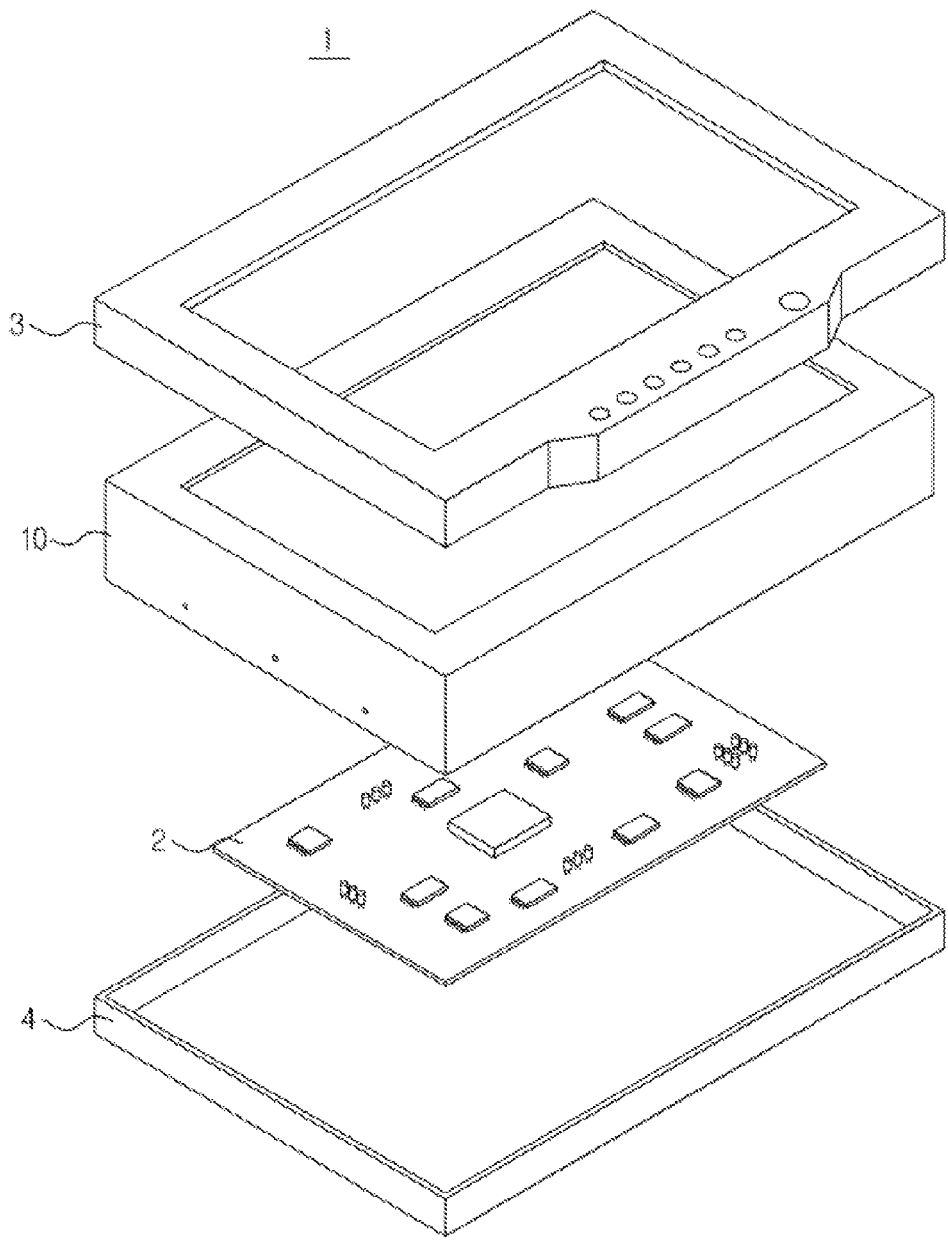
FIG. 1 is an exploded view illustrating an LCD according to an embodiment of the present invention.

Reference will now be made in detail to the embodiments of the present invention, examples of which are illustrated in the accompanying drawings, wherein like reference numerals refer to like elements throughout.

Figure 2:
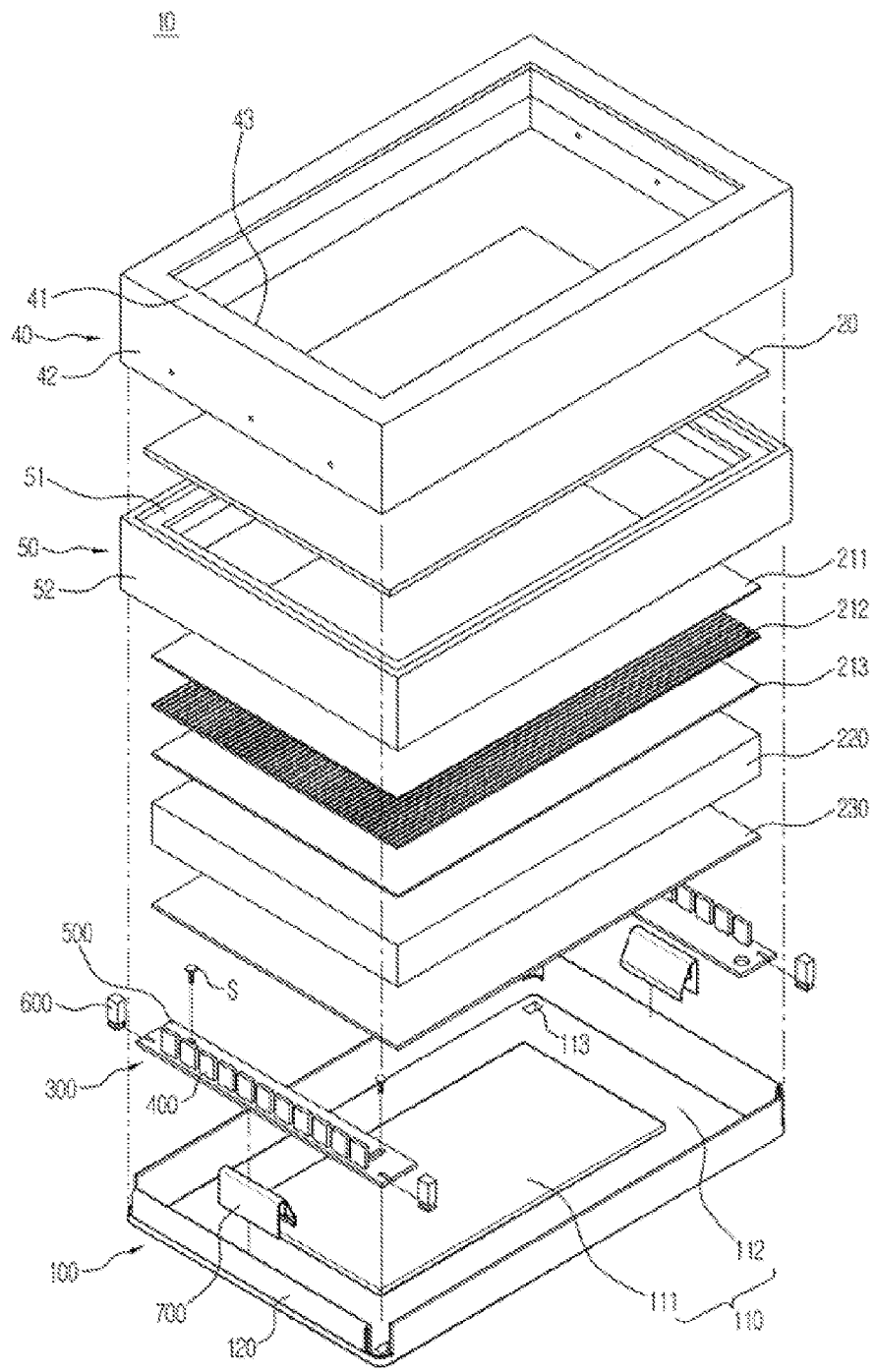
FIG. 2 is an exploded view illustrating a liquid crystal module of the LCD in FIG. 1.

FIG. 1 is an exploded view illustrating an LCD according to an embodiment of the present invention. FIG. 2 is an exploded view illustrating a liquid crystal module of the LCD in FIG. 1.

Referring to FIGS. 1 and 2, a LCD (Liquid Crystal Display) 1 may include a liquid crystal module 10, a main board 2 which applies an electric signal to the liquid crystal module 10 to activate the liquid crystal module 10, and an upper cover 3 and a lower cover 4 which receive and support (e.g., hold or accommodate) the liquid crystal module 10 and the main board 2. The LCD may be applied to a variety of electronic devices, and more particularly to a variety of electronic devices having displays. For example, one of ordinary skill in the art would understand that an LCD may be used or implemented in various electronic devices such as a television, computer, laptop, smartphone, tablet, cellular phone, monitors, watches, and the like.

The liquid crystal module 10 may include a liquid crystal panel 20 on which an image is displayed, a backlight unit to project light onto the liquid crystal panel 20, and chassis assemblies 40, 50 and 100 which support the liquid crystal panel 20 and LED modules 300.

Although not separately shown, the liquid crystal panel 20 may include two glass substrates, a liquid crystal which is filled between the two glass substrates and transmittance of which varies according to an applied voltage, and an electrode which applies the voltage to the liquid crystal.

The backlight unit may include LED modules 300, a light guide plate 220, a reflective sheet 230, a diffusion sheet 213, a prismatic sheet 212, and a protective sheet 211.

Each of the LED modules 300 may include LEDs 400 which are light sources disposed toward a side surface of the light guide plate 220 so as to be spaced apart from each other by a predetermined interval, a printed circuit board 500 on which the LEDs 400 are mounted, and contact members 600 which are arranged to come into contact with the light guide plate 220. That is, as can be seen from FIG. 2, the LEDs 400 may be arranged in a row or column along an axis (e.g., a width-wise axis of the liquid crystal module 10, a length-wise axis of the liquid crystal module 10, or a combination thereof). Each of the LEDs 400 may be spaced apart from one another at regular intervals, or at random intervals. Further, liquid crystal module 10 may be shaped, constructed, or formed, so that a displayed image has a desired aspect ratio (e.g., 16:9, 4:3, 8:5, etc.). The LED modules 300 and LEDs 400 may be arranged along a shorter side or the longer side, or a combination thereof.

Each of the LEDs 400 may be vertically mounted on the printed circuit board 500, and a luminous surface 410 (see FIG. 4) may be located on a side surface of the LED 400, thereby enabling light to be emitted toward the side surface of the light guide plate. A plurality of LEDs 400 may be provided, and may be mounted in a line with a predetermined interval in a longitudinal direction of the printed circuit board 500.

The printed circuit board 500 may be made of a material having high thermal conductivity such as aluminum, and be arranged to come into contact with a bottom chassis 100. Accordingly, heat generated from the printed circuit board 500 may be conducted to the bottom chassis 100, thereby being able to easily radiate heat from the printed circuit board 500. The printed circuit board 500 may be constructed, disposed, or formed along an interior side of the bottom chassis 100. Thus, the printed circuit board 500 may form a strip having a relatively longer first side (i.e., the longitudinal side) than a relatively shorter second side (i.e., the width-wise side).

The LED modules 300 may be disposed at respective edge portions of the LCD 1. Although the LED modules 300 are disposed at the opposite edge portions of the LCD 1 in the embodiment, the present invention is not limited thereto. For example, an LED module 300 may be disposed at one edge portion, or LED modules 300 may also be respectively disposed at two or three or four edge portions.

The LED module 300 which is disposed at each of the edge portions emits light toward a central portion of the LCD 1. The light may be incident upon the side surface of the light guide plate 220, be emitted onto an upper surface thereof, and then be projected onto the liquid crystal panel 20. Accordingly, the side surface 221 (see FIG. 4) may be an incident surface, and the upper surface 222 (see FIG. 4) may be an emitting surface.

The light guide plate 220 may guide light emitted from each of the LEDs 400 onto the liquid crystal panel 20. The light guide plate 220 may have a substantially hexahedral shape, and be made of a plastic material (e.g., a thermoplastic material, a transparent thermoplastic material), such as PMMA having superior light transmittance. The light guide plate 220 may be formed, on a bottom surface thereof, with various patterns. These patterns prevent total reflection of light incident upon the side surface of the light guide plate 220 to allow the light to be uniformly emitted onto the upper surface of the light guide plate 220.

The reflective sheet 230 may be arranged below the light guide plate 220, and may reflect light, which is total-reflected by the light guide plate 220 and is directed downwards, to the light guide plate 220 again. The diffusion sheet 213 may be arranged over the light guide plate 220, and may diffuse light emitted from the upper surface of the light guide plate 220. The diffusion sheet 213 may be formed with a bead-shaped coating layer to diffuse the light. The prismatic sheet 212 may concentrate light, which is diffused by the diffusion sheet 213, in a direction perpendicular to the liquid crystal panel 20. The protective sheet 211 may be arranged over the prismatic sheet 212, and may protect the prismatic sheet 212 which is sensitive to scratching.

The chassis assemblies 40, 50 and 100 may be constituted of a top chassis 40, a middle mold 50, and a bottom chassis 100. The top chassis 40 may include an opening 43 to expose the liquid crystal panel 20, a bezel portion 41 to form an edge portion of the liquid crystal module 10, and an upper side wall 42.

The middle mold 50 may include a middle side wall 52, and a support wall 51 which protrudes inwards from the middle side wall 52 so as to support (e.g., hold or accommodate) the liquid crystal panel 20. That is, the support wall 51 may form a recess or groove in the middle mold 50 to hold or accommodate the liquid crystal panel 20. The liquid crystal panel 20 may be disposed between the bezel portion 41 of the top chassis 40 and the support wall 51 of the middle mold 50.

The bottom chassis 100 may include a bottom portion 110 and a side wall portion 120. The bottom portion 110 may include a board receiving portion 112 to receive the printed circuit board 500 of each LED module 300, and an elevated portion 111 which is lifted upward of the board receiving portion 112 to tightly support the reflective sheet 230. That is, the elevated portion 111 may be elevated or raised relative to the board receiving portion 112 of the bottom portion 110.

Meanwhile, the above-mentioned light guide plate 220 is sensitive to heat because of being made of a plastic material such as PMMA. Thus, if the LCD 1 is increased in temperature, the light guide plate 220 may undergo thermal expansion. In this case, the light guide plate 220 runs a risk of colliding with each LED 400 disposed at the side surface thereof.

Accordingly, the LCD 1 according to an embodiment of the present invention may be provided so that a gap between the light guide plate 220 and the LED 400 may be uniformly maintained in spite of thermal expansion of the light guide plate 220.

To this end, the LED module 300 according to an embodiment of the present invention may be provided to be movable depending on thermal expansion of the light guide plate 220. When the light guide plate 220 undergoes thermal expansion, the LED module 300 moves to the edge side of the LCD 1 in proportion to expansion of the light guide plate 220. Consequently, the gap between the light guide plate 220 and the LED 400 may be uniformly maintained. That is, due to thermal expansion, the light guide plate 220 expands outward from the center of the LCD 1, toward the LED module 300 and toward the edges or sidewalls of the liquid crystal module 10. Based on an embodiment of the present invention, a distance between the light guide plate 220 and the LEDs 400 may be constantly maintained through support received from elastic member 700 and a moveable structure including the printed circuit board 500 and contact member 600 which are coupled to the bottom chassis 100.

For example, the contact members 600 provided in the LED module 300 may be pressed from the light guide plate 220 so as to come into contact with the same (i.e., the light guide plate 220). Meanwhile, the LED module 300 may be elastically supported by an associated elastic member 700 so that the light guide plate 220 moves to an original position when returned to an original state (e.g., when the light guide plate 220 is cooled). Accordingly, the gap between the light guide plate 220 and the LED 400 may be uniformly maintained even when the light guide plate 220 is returned to the original state.

Furthermore, in the LCD 1 according to an embodiment of the present invention, each of the contact members 600 and the elastic members 700 may have a simplified configuration allowing for the LCD 1 to be more easily assembled. Hereinafter, the following description will be given of a moving structure of the LED module 300 and a structure of the contact member 600 and the elastic member 700.

Figure 3:
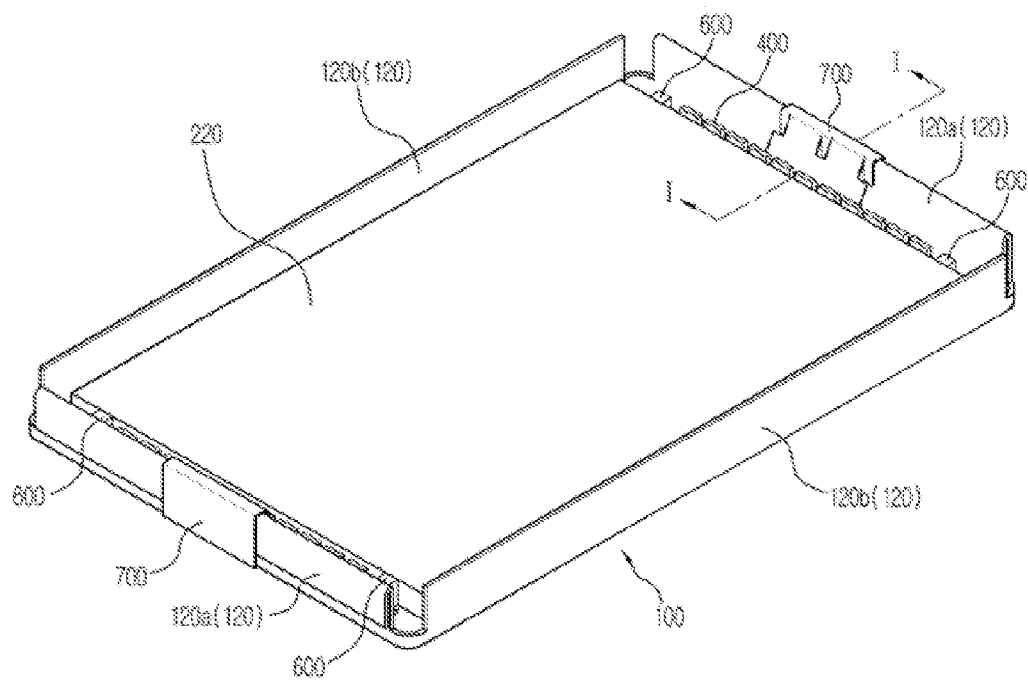
FIG. 3 is a view illustrating a state of coupling LED modules and elastic members to a bottom chassis of the LCD in FIG. 1.
Figure 4:
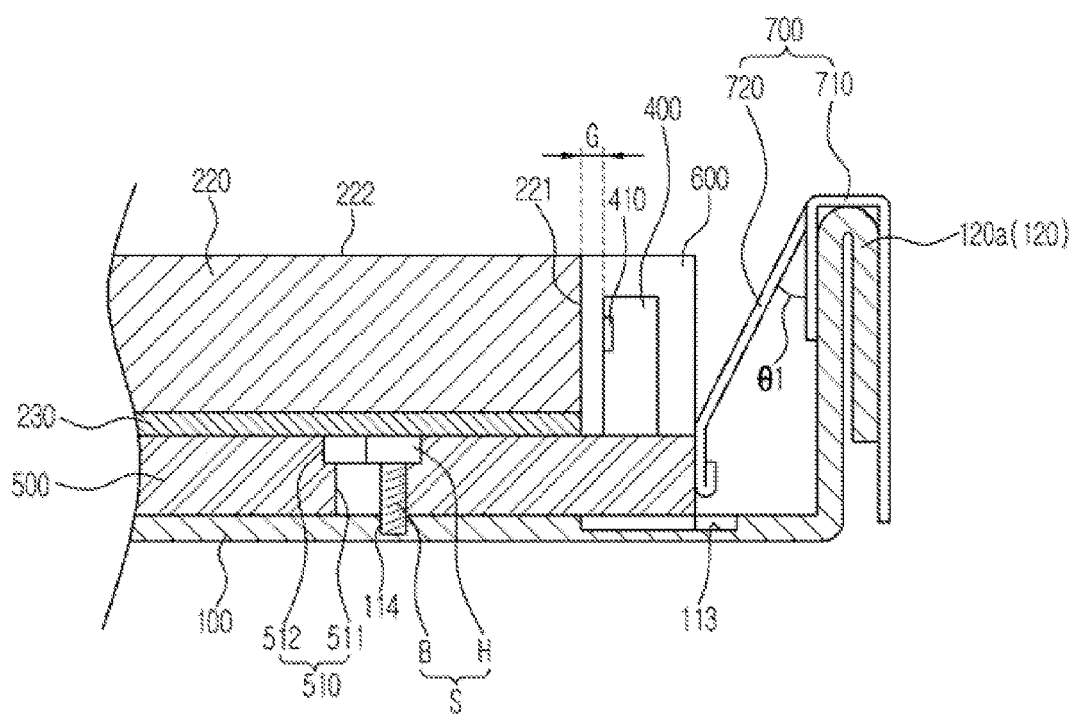
FIG. 4 is a cross-sectional view taken along line I-I of FIG. 3.
Figure 5:
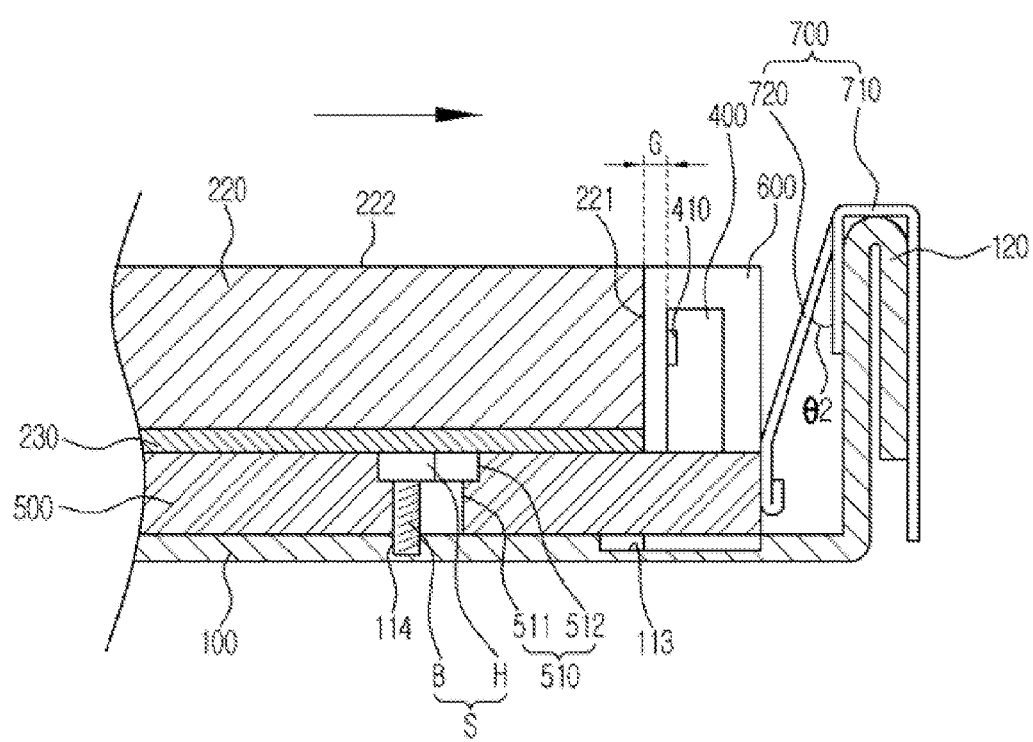
FIG. 5 is a cross-sectional view illustrating a state in which a light guide plate of the LCD in FIG. 1 undergoes thermal expansion.
Figure 6:
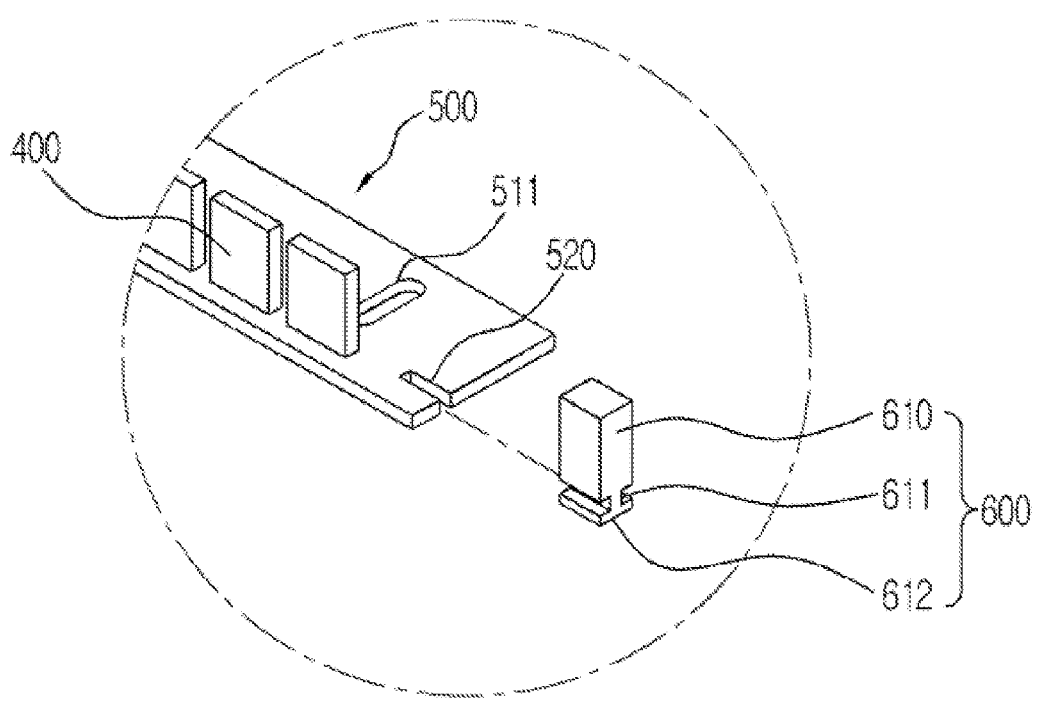
FIG. 6 is a cross-sectional view illustrating a coupling structure between one printed circuit board and one contact member of the LCD in FIG. 1.
Figure 7:
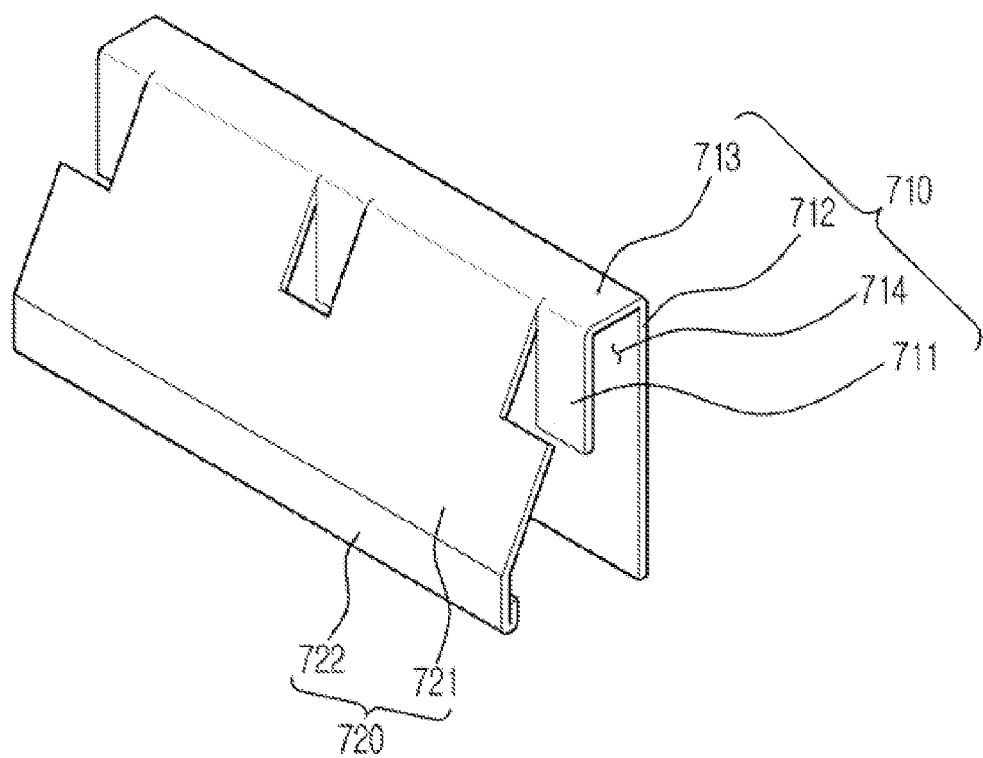
FIG. 7 is a view illustrating the elastic member of the LCD in FIG. 1.
Figure 8:
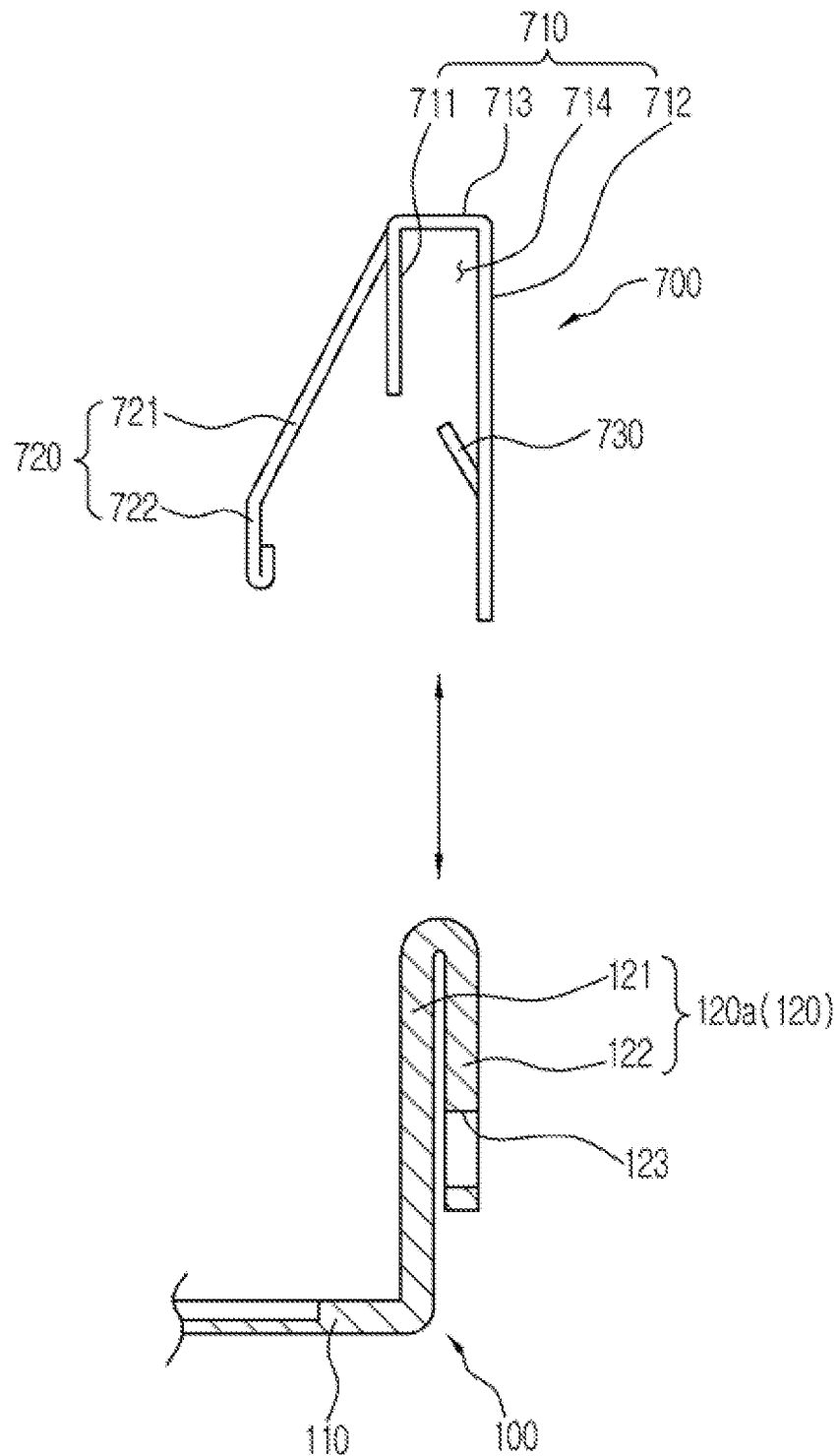
FIG. 8 is a view illustrating a coupling structure between the bottom chassis and the elastic member of the LCD in FIG. 1.

FIG. 3 is a view illustrating a state of coupling the LED modules and the elastic members to the bottom chassis of the LCD in FIG. 1. FIG. 4 is a cross-sectional view taken along line I-I of FIG. 3. FIG. 5 is a cross-sectional view illustrating a state in which the light guide plate of the LCD in FIG. 1 undergoes thermal expansion. FIG. 6 is a cross-sectional view illustrating a coupling structure between one printed circuit board and one contact member of the LCD in FIG. 1. FIG. 7 is a view illustrating the elastic member of the LCD in FIG. 1. FIG. 8 is a view illustrating a coupling structure between the bottom chassis (e.g., a sidewall of the bottom chassis) and the elastic member of the LCD in FIG. 1.

Referring to FIGS. 3 to 8, each printed circuit board 500 may be movably coupled to the bottom chassis 100 of the chassis assemblies. The printed circuit board 500 may be movably coupled to the bottom chassis 100 by coupling members S. For example, each of the coupling members S may be a screw.

The printed circuit board 500 may be formed with a coupling hole 510 through which the screw S passes, and the bottom chassis 100 may be formed with a coupling hole 114 through which the screw S passes. The screw S may include a threaded body portion B and a head portion H formed at a top of the body portion B. The coupling hole 510 of the printed circuit board 500 may include an upper coupling hole 512 which receives the head portion H, and a lower coupling hole 511 which receives the body portion B.

The screw S may be received in the coupling hole 510 of the printed circuit board 500 so that a top end of the head portion H is flush with an upper surface of the printed circuit board 500. For example, the head portion H of the screw may be flat, however the disclosure is not so limited. Thus, the reflective sheet 230 may be evenly supported by the printed circuit board 500. The screw S may be fastened to the coupling hole 510 in a direction downward from an upper side of the printed circuit board 500.

The coupling hole 114 of the bottom chassis 100 may generally have a diameter equal to the diameter of the body portion B of the screw S. Accordingly, the screw S may be fastened to the bottom chassis 100.

The coupling hole 510 of the printed circuit board 500 may a long hole which is formed lengthily in a moving direction of the printed circuit board 500. In addition, the screw S may be loosely fastened to the coupling hole 510 of the printed circuit board 500. Thus, the printed circuit board 500 may be movable even after the screw S is fastened to the printed circuit board 500 and the bottom chassis 100. In this case, the screw S and the coupling hole 510 may serve to guide movement of the printed circuit board 500.

Meanwhile, the contact member 600 may be provided to come into contact with the side surface of the light guide plate 220, and may be directly pressed from the light guide plate 220 during thermal expansion thereof. That is, the contact member 600 may be pressed from the light guide plate 220, and thus the light guide plate 220 may not collide with the LED 400. The printed circuit board 500 may be provided with a plurality of contact members 600, for example, a pair of contact members 600. In an example embodiment, the respective contact members 600 may be provided at opposite ends of the printed circuit board 500 in a longitudinal direction thereof. As can be seen from FIGS. 4 through 6, the contact member 600 may have a width greater than a width of the LEDs 400.

Although each of the contact members 600 may be provided separately from the printed circuit board 500 to be coupled to the printed circuit board 500 in the embodiment, the present invention is not limited thereto. For example, the contact member 600 and the printed circuit board 500 may also be integrally formed.

As shown in FIG. 6, the printed circuit board 500 and the contact member 600 may have a relatively simple coupling structure. The printed circuit board 500 may be formed with a fixing groove 520, and the contact member 600 may be fitted into the fixing groove 520.

The contact member 600 may include an insertion portion 611 inserted into the fixing groove 520, a contact portion 610 formed at an upper side of the insertion portion 611 so as to come into contact with the light guide plate 220, and a support portion 612 supported by a back surface of the printed circuit board 500. As can be seen from FIG. 6, the insertion portion 611 and support portion 612 are connected to form an upside-down shaped T-structure.

Since the insertion portion 611 may be tightly fitted into the fixing groove 520 and the support portion 612 may be pressed against the back (bottom) surface of the printed circuit board 500, the contact member 600 may be fixed to the printed circuit board 500 and may not be separated from the printed circuit board 500 even when the contact portion 610 is pressed by the light guide plate 220.

For example, the bottom chassis 100 may be formed with a receiving groove 113 to movably receive the support portion 612 of the contact member 600. The printed circuit board 500 may be pressed against the bottom portion 110 of the bottom chassis 100 by receiving the support portion 612 in the receiving groove 113. Consequently, heat may be conducted from the printed circuit board 500 into the bottom chassis 100, thereby enabling the heat to be smoothly radiated from the printed circuit board 500.

By such a structure, when the light guide plate 220 undergoes thermal expansion to press the contact member 600, the printed circuit board 500 and thus the LED 400 mounted on the printed circuit board 500 may be moved. That is, as the light guide plate 220 expands, the printed circuit board 500 and LED 400 mounted on the printed circuit board 500 also move outward (away from the center of the LCD) toward the sidewall via the coupling structure to be discussed in further detail below. Accordingly, as shown comparatively in FIGS. 4 and 5, the gap G between the light guide plate 220 and the LED 400 may be uniformly maintained even when the light guide plate 220 undergoes thermal expansion.

Meanwhile, the LED module 300 may be elastically supported by the elastic member 700. Accordingly, when the light guide plate 220 is returned to the original state, the LED module 300 is also moved to an original position. Consequently, the gap G between the light guide plate 220 and the LED 400 may be still uniformly maintained.

Although one elastic member 700 is shown with respect to one LED module 300 in the embodiment, the present invention is not limited thereto. For example, two or more elastic members 700 may be provided with respect to one LED module 300. Furthermore, the elastic member 700 is not limited as to shape so long as the LED module 300 may be elastically supported by the elastic member 700. For example, the elastic member 700 according to an embodiment of the present invention may be a plate spring formed by bending a steel plate.

The elastic member 700 may be coupled to the side wall portion 120 of the bottom chassis 100. As shown in FIGS. 7 and 8, the elastic member 700 may include a fixing portion 710 having a coupling groove 714 into which the side wall portion 120 is fitted, and a variable portion 720 which extends obliquely (e.g., at an angle) from the fixing portion 710 so as to come into contact with the LED module 300.

In this case, in the side wall portion 120 of the bottom chassis 100, each of a pair of opposed side wall portions 120$a$ (see FIG. 3) to which the respective elastic members 700 are coupled may be formed to be bent once and folded in two, unlike another pair of side wall portions 120$b$ (see FIG. 3). That is, the side wall portion 120$a$ may be constituted of an inner wall portion 121 and an outer wall portion 122 which is bent from and formed outside the inner wall portion 121. Accordingly, the side wall portion 120$a$ is increased in thickness, and may be more securely coupled in the coupling groove 714 of the elastic member 700. The above-described double-wall configuration may be applied to one or more (for example, two, three, or all) side walls of the bottom chassis 100.

The fixing portion 710 of the elastic member 700 may include first fixing legs 711 pressed against the inner wall portion 121, a second fixing leg 712 pressed against the outer wall portion 122, and a connection portion 713 connecting the first and second fixing legs 711 and 712. The first fixing legs 711, the connection portion 713, and the second fixing leg 712 may define the coupling groove 714 therein.

In addition, a locking protrusion 730 may obliquely protrude upwards (at an angle) from the inside of the second fixing leg 712 of the fixing portion 710. The locking protrusion 730 may be provided to be elastically deformable.

Accordingly, the locking protrusion 730 may be inserted into a locking groove 123 formed at the side wall portion 120 while being opened sideways, when the locking protrusion 730 is pressed against the second fixing leg 712 side and then the side wall portion 120 is fully inserted into the coupling groove 714, during entry of the side wall portion 120 into the coupling groove 714. The elastic member 700 may be locked to the bottom chassis 100 by insertion of the locking protrusion 730 into the locking groove 123.

The variable portion 720 may obliquely extend downwards (at an angle) from a substantially upper end of the fixing portion 710. The variable portion 720 may include a body portion 721 and a foot portion 722 which is formed at an end of the body portion 721 to come into contact with the LED module 300. For example, the foot portion 722 may come into contact with the printed circuit board 500 of the LED module 300.

As shown in FIGS. 4 and 5, the elastic member 700 may be elastically deformed so that an angle between the variable portion 720 and the fixing portion 710 is varied. Accordingly, assuming that the angle between the variable portion 720 and the fixing portion 710 is θ1, as shown in FIG. 4, when the light guide plate 220 is in the original state, the angle between the variable portion 720 and the fixing portion 710 is decreased to be θ2, as shown in FIG. 5, when the light guide plate 220 undergoes thermal expansion and the LED module 300 is moved, thereby enabling an elastic force to be accumulated. The elasticity of the elastic member 700 may be determined or selected based on a desired deformation rate. For example, the elasticity of the elastic member 700 may be determined or selected to correspond to or based on a known or predetermined rate of thermal expansion of the light guide plate 220.

For example, when the light guide plate 220 is returned to the original state (for example, when the light guide plate 220 cools), the elastic member 700 may be recovered so that angle between the variable portion 720 and the fixing portion 710 is returned to θ1 which is an original angle by the accumulated elastic force. Thus, the LED module 300 may be pushed or be moved to be returned to the original position.

Figure 9:
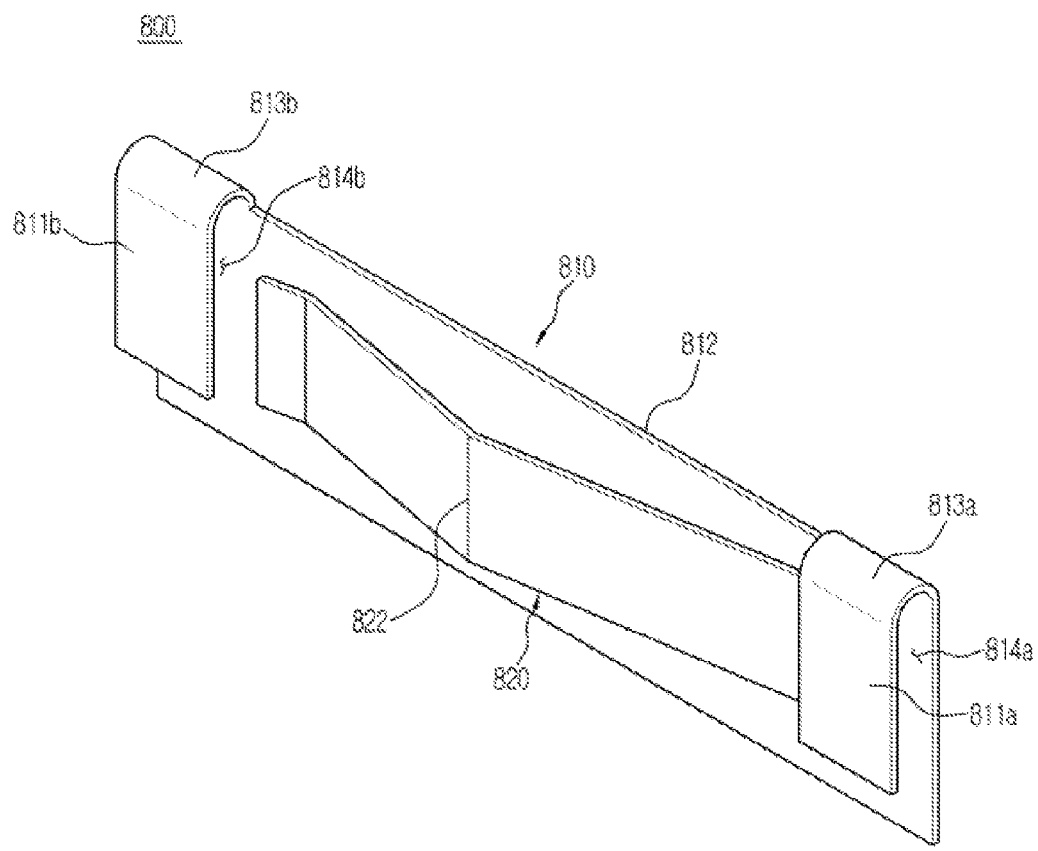
FIGS. 9 and 10 are views illustrating an elastic member of an LCD according to an embodiment of the present invention.
Figure 10:
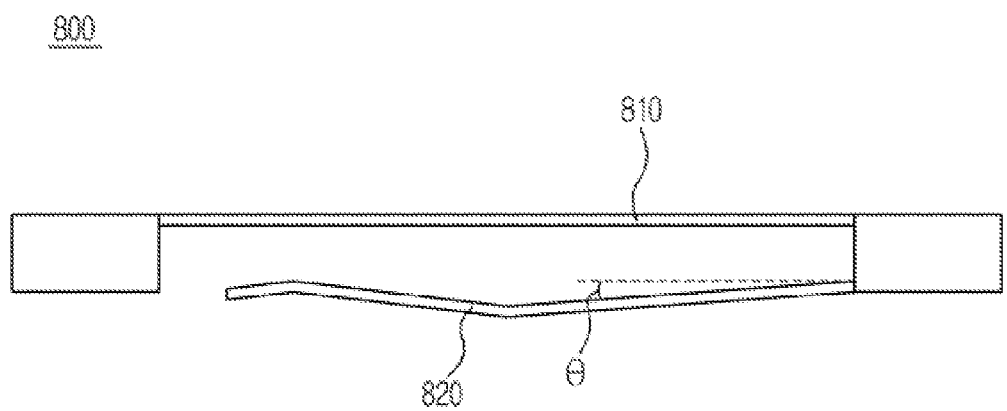

FIGS. 9 and 10 are views illustrating an elastic member of an LCD according to a second embodiment of the present invention.

An LCD according to an embodiment of the present invention will be described with reference to FIGS. 9 and 10. The same components as those of the LCD according to the first embodiment of the present invention are denoted by the same reference numerals, and the description thereof will be omitted.

An elastic member 800 may be a plate spring formed by bending a steel plate. The elastic member 800 may include a fixing portion 810 having coupling grooves 814$a$ and 814$b$ into which the side wall portion 120 of the bottom chassis 100 is fitted, and a variable portion 820 which extends obliquely (at an angle) from the fixing portion 810 so as to come into contact with the LED module 300.

The fixing portion 810 of the elastic member 800 may include a pair of first fixing legs 811$a$ and 811$b$ pressed against the inner wall portion 121, a second fixing leg 812 pressed against the outer wall portion 122, and a pair of connection portions 813$a$ and 813$b$ which connect the pair of first fixing legs 811$a$ and 811$b$ and the second fixing leg 812. The first fixing legs 811$a$ and 811$b$, the connection portions 813$a$ and 813$b$, and the second fixing leg 812 may define the coupling grooves 814$a$ and 814$b$ therein.

For example, the respective first fixing legs 811$a$ and 811$b$ may be formed to be spaced apart from each other by a determined (predetermined) distance. For example, the first fixing legs 811$a$ and 811$b$ may be disposed at opposite ends of the fixing portion 810. The variable portion 820 may substantially extend inwards from an end of any of the first fixing legs 811$a$ and 811$b$ of the fixing portion 820. For example, the variable portion 820 may extend to be substantially inclined forwards, and extend to be inclined rearwards again on the basis of a foot portion 822 of the most front position. That is, as shown in FIG. 10, the variable portion may have a first end connected to one of the first fixing legs 811$a$ and 811$b$ of the fixing portion 820. The first end may extend inward toward the LED module and to be inclined away from the fixing portion 810, until the foot portion 822 when the variable portion then extends outward away from the LED module to be inclined toward the fixing portion 810, forming a substantially V-shaped structure. The foot portion 822 is the foremost portion of the variable portion, being closest to the LED module. A second end of the variable portion, opposite of the first end, is deflected in one direction, for example, in a direction away from the fixing portion 820, and is connected to the V-shaped structure described above.

The foot portion 822 may come into contact with the LED module, and may specifically come into contact with the printed circuit board 500 of the LED module 300.

As shown in FIG. 10, the elastic member 800 may be elastically deformed so that an angle θ between the variable portion 820 and the fixing portion 810 is varied.

As described above, in accordance with the LCD 1 according to the example embodiments of the present invention, the gap between the light guide plate 220 and the LED 400 may be uniformly maintained in spite of thermal expansion of the light guide plate 220. Thus, since the LED 400 does not collide with the light guide plate 220, the light guide plate 220 and the LED 400 may be designed to be closer to each other, compared with the related art. Therefore, the LCD 1 may have increased brightness at the same power consumption, while having reduced power consumption at the same brightness, when compared to conventional LCD structures.

Since each of the contact members 600 and the elastic members 700 and 800 has a relatively simple shape and may be assembled by fitting, they may be easily assembled to the printed circuit board 500 and the bottom chassis 100 without a separate coupling member.

As is apparent from the above description, a gap between a light guide plate and an LED may be uniformly maintained in spite of thermal expansion of the light guide plate.

Accordingly, a phenomenon in which the light guide plate collides with the LED may be prevented even though the light guide plate undergoes thermal expansion.

In addition, since the gap between the light guide plate and the LED may be designed to be close to the maximum, a liquid crystal panel has increased brightness, and thus power consumption may be reduced at the same brightness. That is, the disclosure according to the example embodiments disclosed herein allows for a gap between the light guide plate and the LED to be designed such that the gap is minimized as much as possible.

The LCD according to the example embodiments disclosed herein may be implemented in any electronic device, for example electronic devices having a LCD display.

Although example embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A liquid crystal display comprising:
   a chassis assembly;
   a liquid crystal panel to display an image;
   a light guide plate to guide light to the liquid crystal panel;
   a LED (light emitting diode) module which is movable relative to the chassis assembly, the LED module comprising a printed circuit board disposed below the light guide plate, a plurality of LEDs mounted on the printed circuit board, and a plurality of contact members provided in the printed circuit board to contact a side surface of the light guide plate; and
   an elastic member to elastically support the LED module,
   wherein the plurality of contact members are arranged in alignment with the plurality of LEDs, and include a first contact member provided at one end of the plurality of LEDs and a second contact member provided at the other end of the plurality of LEDs, and
   wherein the printed circuit board is formed with a fixing groove on an outer edge of the printed circuit board and is configured so that one of the plurality of contact members is slideable into the fixing groove.

2. The liquid crystal display according to claim 1, wherein:
   the LED module is adapted to move in a first direction by pressing of the light guide plate against the plurality of contact members, when the light guide plate undergoes thermal expansion, and
   the LED module is adapted to move in an opposite direction of the first direction, by an elastic force of the elastic member, when the light guide plate is returned to an original state.

3. The liquid crystal display according to claim 1, wherein the liquid crystal display is adapted to maintain a uniform gap between the light guide plate and the plurality of LEDs due to thermal expansion of the light guide plate.

4. The liquid crystal display according to claim 1, wherein the plurality of contact members are provided separately from and coupled to the printed circuit board.

5. The liquid crystal display according to claim 1, wherein the plurality of contact members comprises a contact portion to contact the light guide plate, an insertion portion inserted into the fixing groove, and a support portion supported by a back surface of the printed circuit board.

6. The liquid crystal display according to claim 1, wherein the plurality of contact members and the printed circuit board are integrally formed.

7. The liquid crystal display according to claim 1, wherein:
   the chassis assembly comprises a top chassis having an opening to expose the liquid crystal panel, a middle mold to support the liquid crystal panel, and a bottom chassis to support the printed circuit board; and
   the printed circuit board is movably coupled to the bottom chassis.

8. The liquid crystal display according to claim 7, further comprising:
   a coupling member to couple the printed circuit board to the bottom chassis,
   wherein the printed circuit board is formed with a coupling hole which is lengthily provided in a moving direction of the printed circuit board so that the coupling member is fastened into the coupling hole.

9. The liquid crystal display according to claim 7, wherein:
   the bottom chassis comprises a bottom portion and a side wall portion; and
   the elastic member is coupled to the side wall portion.

10. The liquid crystal display according to claim 1, wherein the plurality of LEDs are vertically mounted on the printed circuit board and are adapted to emit light toward the side surface of the light guide plate.

11. A liquid crystal display comprising:
    a chassis assembly including a bottom chassis including a side wall portion;
    a liquid crystal panel to display an image;
    a light guide plate to guide light to the liquid crystal panel;
    a LED (light emitting diode) module which is movable relative to the chassis assembly, the LED module comprising a printed circuit board disposed below the light guide plate, a plurality of LEDs mounted on the printed circuit board, and a plurality of contact members provided in the printed circuit board to contact a side surface of the light guide plate; and
    an elastic member to elastically support the LED module,
    wherein the plurality of contact members are arranged in alignment with the plurality of LEDs, and include a first contact member provided at one end of the plurality of LEDs and a second contact member provided at the other end of the plurality of LEDs,
    the elastic member comprises a fixing portion having a coupling groove into which the side wall portion is fitted, and a variable portion which extends obliquely from the fixing portion to come into contact with the LED module, and the elastic member is elastically deformed so that an angle between the fixing portion and the variable portion is varied.

12. The liquid crystal display according to claim 11, wherein:
the side wall portion comprises a locking hole; and
the elastic member comprises a locking protrusion which extends obliquely from the fixing portion and is inserted into the locking hole to prevent the elastic member from being separated from the side wall portion.

13. A liquid crystal display comprising:
a bottom chassis;
a printed circuit board movably coupled to an edge portion of the bottom chassis;
a plurality of LEDs (light emitting diodes) mounted on the printed circuit board in a longitudinal direction;
a pair of contact members provided at opposite ends of the printed circuit board, and arranged in alignment with the plurality of LEDs;
a light guide plate disposed above the printed circuit board to contact the pair of contact members; and
an elastic member coupled to the bottom chassis to elastically support the printed circuit board,
wherein:
each of the contact members comprises a contact portion to contact the light guide plate, an insertion portion inserted into a fixing groove, and a support portion supported by a back surface of the printed circuit board; and
the bottom chassis comprises a receiving groove to receive the support portion.

14. The liquid crystal display according to claim 13, wherein:
the printed circuit board and the plural LEDs mounted on the printed circuit board are adapted to move in a first direction by pressing of the light guide plate against the pair of contact members, when the light guide plate undergoes thermal expansion, and the printed circuit board and the plural LEDs mounted on the printed circuit board are adapted to move in an opposite direction of the first direction by an elastic force of the elastic member, when the light guide plate is returned to an original state.

15. The liquid crystal display according to claim 13, wherein:
the bottom chassis comprises a bottom portion and a side wall portion; and
the elastic member comprises a fixing portion having a coupling groove into which the side wall portion is fitted, and a variable portion which extends obliquely from the fixing portion to come into contact with the printed circuit board.

16. The liquid crystal display according to claim 13, further comprising a top chassis having an opening to expose a liquid crystal panel, and a middle mold to support the liquid crystal panel.

17. A display device comprising:
a liquid crystal panel to display an image;
a light guide plate to guide light to the liquid crystal panel;
a bottom chassis including a side wall portion;
a LED (light emitting diode) module comprising a printed circuit board disposed below the light guide plate and movably coupled to the bottom chassis, a plurality of LEDs mounted on the printed circuit board, and a plurality of contact members provided in the printed circuit board to contact a side surface of the light guide plate;
a coupling member to couple the printed circuit board to the bottom chassis; and
an elastic member to elastically support the LED module,
wherein the plurality of contact members are arranged in alignment with the plurality of LEDs, and include a first contact member provided at one end of the plurality of LEDs and a second contact member provided at the other end of the plurality of LEDs,
the elastic member comprises a fixing portion having a coupling groove into which the side wall portion is fitted, and a variable portion which extends obliquely from the fixing portion to come into contact with the LED module, and
the elastic member is elastically deformed so that an angle between the fixing portion and the variable portion is varied.

18. The display device according to claim 17, wherein the coupling member is a screw.

19. A liquid crystal display comprising:
a liquid crystal panel to display an image;
a light guide plate to guide light to the liquid crystal panel;
a bottom chassis;
a light source module comprising a printed circuit board disposed below the light guide plate and movably coupled to the bottom chassis, a plurality of light sources mounted on the printed circuit board a predetermined distance from the light guide plate, and a plurality of contact members disposed on the printed circuit board adjacent to the light guide plate; and
a coupling member to couple the printed circuit board to the bottom chassis,
wherein the plurality of contact members are arranged in alignment with the plurality of light sources, and include a first contact member provided at one end of the plurality of light sources and a second contact member provided at the other end of the plurality of light sources, and
wherein the printed circuit board is formed with a fixing groove on an outer edge of the printed circuit board and is configured so that one of the plurality of contact members is slideable into the fixing groove.

20. The liquid crystal display according to claim 19, the printed circuit board is adapted to move in proportion to an expansion of the light guide plate while maintaining the predetermined distance between the light sources and light guide plate.

21. The liquid crystal display according to claim 19, further comprising an elastic member to elastically support the light source module.

22. The liquid crystal display according to claim 21, wherein the elastic member comprises a plate spring.

23. The liquid crystal display according to claim 21, wherein the elastic member contacts the printed circuit board and the plurality of contact members, and is deformable according to an expansion of the light guide plate.

24. The liquid crystal display according to claim 23, wherein a distance between the light source module and a side wall of the bottom chassis decreases or increases according to the expansion of the light guide plate and the deformation of the elastic member.

* * * * *